United States Patent Office 3,364,049
Patented Jan. 16, 1968

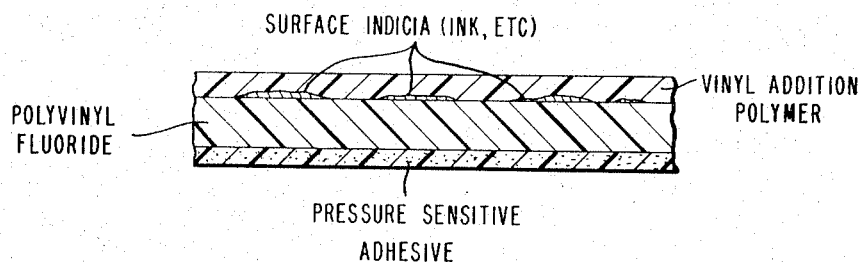

3,364,049
SELF-DESTRUCTIBLE DECAL WITH ADHESIVE ON ONE SURFACE AND INDICIA COVERED BY A VINYL ADDITION POLYMER ON THE OTHER
Gedeon I. Deak, Buffalo, N.Y., and Francis E. Izzo, Wilmington, Del., assignors to E. I. du Pont de Nemours and Company, Wilmington, Del., a corporation of Delaware
Filed Apr. 27, 1964, Ser. No. 362,924
6 Claims. (Cl. 117—1)

ABSTRACT OF THE DISCLOSURE

Self-destructible composite film of defined tenacity, a peelable adhesive on one surface, indicia covered by a vinyl addition polymer of good weatherability for a fixed period on the other surface whereupon normal weathering destroys it.

This invention relates to self-destructible composite film articles. More particularly, this invention is directed to an improved self-destructible label or the like having a base support of polyvinyl fluoride of critical characteristics.

The need for self-destructible labels, tags, tabs, strips, or the like, of excellent properties is well recognized. These articles are used for adhesively applying a desired indicia, sign, marking, printing, or the like to larger articles for labeling purposes. Such articles include fuel containers, airplanes, vehicles, packages, drum, etc.

However, in spite of the known need, a label satisfactory for extremely rugged conditions has not previously been attained.

The self-destructible composite film articles of this invention are sometimes referred to as "decals." Previous attempts to provide satisfactory decals have been less than successful because, while the article might have been self-destructible, it lacked suitable weathering properties; or while some properties may have been satisfactory, it lacked desired initial elongation or shinkage; or possibly the composite article became too brittle too soon under rigorous weathering conditions. These disadvantages are believed to be overcome by the present invention.

According to the present invention, a self-destructible composite film article is provided comprising a base sheet of polyvinyl fluoride having a tenacity in the range of about 1,800 to about 3,500, and preferably in the range of 2,000 to 2,500 lbs./sq. in., the sheet having on one surface a pressure-sensitive adhesive layer having a peel strength greater than 50 ozs./in., and said sheet having on the opposite surface the desired indicia convered by a thin layer, at least 0.5 mil thick, of a vinyl addition polymer of at least one polymerized ester of methacrylic acid with a monohydric alkanol of 1–8 carbon atoms, said polymer having a substituents each of which bears on adjacent carbon atoms a hydroxyl radical and an amino radical bearing at least one active hydrogen atom, said amino radicals in said substituents containing about from 0.01 to 1.0% of amino nitrogen based on the weight of said polymer, said polymer having a glass transition temperature, that is, a second-order transition temperature, of 35° to 100° C. and a degree of polymerization of at least about 1,200, the entire self-destructible composite film article having an initial elongation greater than 15% and a shrinkage of less than 2%. The indicia can of course be incorporated in the vinyl polymer layer.

In the drawing, the sole figure comprises a fragmentary cross-sectional schematic view of a self-destructible composite film article in accordance with our invention.

Any suitable method of preparing the polyvinyl fluoride film having the tenacity of 1,800–3,500 lbs./sq. in. can be employed. For example, the polyvinyl fluoride sheet can be prepared in accordance with the general procedures of Bartron U.S. Patent No. 2,953,818 issued Sept. 27, 1960, or in accordance with Prengle and Richards U.S. application Ser. No. 277,820 filed May 3, 1963, now Patent No. 3,139,470 and assigned to the same assignee as that of the present application. The films thus prepared are suitably oriented by stretching in the longitudinal and transverse directions, a satifactory stretch ratio being on the order of about 1.3 in the longitudinal direction and 1.75 in the transverse direction. To improve adhesion of the polyvinyl fluoride film to the coatings to be applied, the film can be advantageously flame treated in accordance with the procedures described in Bryan and Swarts U.S. application Ser. No. 210,790, now Patent No. 3,153,684 filed July 18, 1962, and assigned to the same assignee as that of the present invention.

The polyvinyl fluoride film is made having the appropriate tenacity to which the present invention is limited by any suitable method. One method, for example, involves "loading" the film with between about 40 to 60% by weight of an inert particulate filler such as calcium carbonate, titanium dioxide, or the like. Particularly satisfactory is a polyvinyl fluoride film of about 2 mil thick containing 24% by weight of calcium carbonate having a particle size distribution of 2–40 microns with an average particle size of 10–18 microns, with 20% by weight titanium dioxide having an average particle size of 0.5 micron. Additionally, suitable stabilizers, opacifiers, coloring agents, or the like can be used if desired.

In order to impart the critical weatherability and self-destructibility properties to the composite film article, the use of the vinyl addition polymer defined above is especially important. Such materials are not new in the art and are described, for example, in Belgian Patent No. 610,317, the entire disclosure of which is hereby incorporated by reference. However, their use for the present purpose is not known in the art and provide particular benefits in combination with the other components of the composite structure.

By way of illustration and not limitation, the following listed vinyl addition polymers within the above definition can be used with advantage:

(1) | Percent
--- | ---
2-hydroxy-3-aminopropyl methacrylate | 3
Ethyl methacrylate | 62–97
Methyl methacrylate | 35–0

(2) | 
--- | ---
2-hydroxy-3-aminopropyl acrylate | 3
Ethyl methacrylate | 62–97
Methyl methacrylate | 35–0

(3) | 
--- | ---
2-hydroxy-3-aminopropyl methacrylate or acrylate | 3
n-Propyl methacrylate | 37–97
Methyl methacrylate | 60–0

(4) | 
--- | ---
2-hydroxy-3-aminopropyl methacrylate or acrylate | 3
n-Butyl methacrylate | 27–84
Methyl methacrylate | 70–13

(5) | 
--- | ---
2-hydroxy-3-aminopropyl methacrylate or acrylate | 3
n-Pentyl methacrylate | 24–72
Methyl methacrylate | 73–25

(6)

| | Percent |
|---|---|
| 2-hydroxy-3-aminopropyl methacrylate or acrylate | 3 |
| n-Hexyl methacrylate | 20–62 |
| Methyl methacrylate | 77–35 |

(7)

| | |
|---|---|
| 2-hydroxy-3-aminopropyl methacrylate or acrylate | 3 |
| n-Butyl methacrylate | 12–36 |
| n-Hexyl methacrylate | 12–33 |
| Methyl methacrylate | 73–28 |

(8)

| | |
|---|---|
| 2-hydroxy-3-aminopropyl methacrylate or acrylate | 3 |
| n-Butyl methacrylate | 19–48 |
| Ethyl methacrylate | 18–49 |
| Methyl methacrylate | 60–0 |

In the above compositions, percentages are by weight.

Other suitable topcoats include that of Example 1 of the aforementioned Belgian Patent No. 610,317; a methyl methacrylate 3920 acrylic clear polymer available from Minnesota Mining and Manufacturing Co.; an acrylic clear 7800 polymer available from Tibbetts and Westerfield; a vinyl clear 39000 series polymer available from Wornow Co.; a modified alkyd resin SN 451 available from Cudnor and O'Connor.

It will be understood that in a separate embodiment of this invention the polyvinyl fluoride layer with the indicia and polymer overcoating is a useful article of commerce and can be sold as such, with the pressure-sensitive adhesive layer being later applied by a converter or user. Likewise, and in the alternative, the polyvinyl fluoride film having the pressure-sensitive adhesive already applied, which polyvinyl fluoride and pressure-sensitive adhesive meets the critical conditions of the present invention, forms a useful article of commerce and can be sold as such, with the indicia and topcoat being applied subsequently by a converter or user. In still another embodiment of the present invention, having particular advantages which cause it to be a preferred embodiment for many applications, an intermediate stratum of the vinyl addition polymer is provided between the polyvinyl fluoride sheet and the indicia. This significantly improves the weathering characteristics of the composite structure. In this latter embodiment it is important that the total thickness of the two vinyl polymer layers not be less than 0.5 mil.

The composite structures of this invention fully meet the requirements for decal material set forth in military specification (MIL D 8634B 8/14/61: Part 3.9.4–Weather-Resistance).

Any suitable indicia can be used. Suitable inks which meet most requirements include the 3900 series, acrylic clear, of Minnesota Mining and Manufacturing Co.; 7800 series, acrylic clear, of Tibbetts and Westerfield; the 39000 series, vinyl clear, of Wornow Co., and the like.

The composite structures of the present invention are outstanding in their weatherability, having for example a life exceeding 12 months of Florida exposure. In addition, the structures have the desired characteristic of removability without destruction for a period of several weeks or months following application, and yet are completely destructible upon attempted removal after a period of four months from the time of application. Furthermore, and this characteristic is also particularly important, the structures are self-destructible in and of themselves, without attempted removal upon exposure to weather conditions for a period somewhat in excess of one year.

By way of exemplification, and not intended as limitation, a base film of 2 mil thick polyvinyl fluoride film which is prepared containing 24% calcium carbonate as described above and 20% titanium dioxide as described above, plus a small amount of a stabilizer, and which is oriented by stretching 1.3 times in the machine direction and 1.75 times in the transverse direction, and which is flame treated as described above, was prepared having a tenacity of about 2,250 lbs./sq. in. and having on one surface a pressure-sensitive adhesive (S–600, Fasson Products Division of Avery Adhesive Products, Inc., Painesville, Ohio), peel strength of 70.5 ozs./in., and on the other surface, over a sample ink printing, a thin layer of an ammoniated acrylic interpolymer of n-butyl methacrylate (64 weight percent)/methyl methacrylate (32.5 weight percent)/glycidyl methacrylate (3.5 weight percent) prepared following the general procedure of Example 1 of the aforementioned Belgian patent. In accelerated tests, self-destructibility is imparted to this structure with as little as 100 hours exposure to the Atlas XW Weather-O-Meter which correlates well with somewhat less than four months actual outdoor Florida exposure. Similarly, exposure to oven temperatures of 158° F. for a period of one week is also sufficient to impart self-destructibility to the structure.

Any suitable pressure-sensitive adhesive can be used which has the essential peel strength set forth above. In place of the polyvinyl fluoride film, polyvinylidene fluoride can be used provided it has the required tenacity.

Similarly, the examples set forth above can be repeated, as will be readily understood by persons skilled in this art, by substituting other vinyl addition polymeric compositions such as those listed above for that of the specific exemplification.

Tenacity as used herein is based upon the cross-sectional area of the film being measured and is determined by elongating a film sample at a rate of 5% per minute or less until the film sample breaks.

Elongation is the percent increase in length at the break of the film in the preceding test.

Peel strength is determined by conventional methods using, for example, a commercially available Suter peeler apparatus.

Glass transition temperature is determined according to known methods such as that described, for example, by Keavney and Eberlin, Journal of Applied Polymer Science, vol. 3, page 47 (1960).

Shrinkage as used herein is determined by measuring a given area on a sheet of film, holding the film in an oven at 150° F. for 48 hours, noting the change in dimension and calculating percent shrinkage, based on the original dimension.

It is to be understood that the foregoing detailed description is given merely by way of illustration and that many variations may be made therein without departing from the spirit or scope of this invention.

The invention claimed is:

1. A self-destructible composite film article comprising a base sheet of polyvinyl fluoride having a tenacity in the range of 1,800–3,500 lbs./sq. in., said sheet having on one surface a pressure-sensitive adhesive layer having a peel strength greater than 50 ozs./in., and said sheet having on the opposite surface indicia covered by a thin layer consisting essentially of a vinyl addition polymer of esters of methacrylic acid with a monohydric alkanol of 1–8 carbon atoms, said polymer having substituents each of which bears on adjacent carbon atoms a hydroxyl radical and an amino radical bearing at least one active hydrogen atom, said amino radicals in said substituents containing from about 0.01 to 1.0% of amino nitrogen based on the weight of said polymer, said polymer having a glass transition temperature of 35°–100° C. and a degree of polymerization of at least about 1,200, said self-destructible composite film article having an initial elongation greater than 15% and a shrinkage of less than 2%.

2. A self-destructible film artcile as set forth in claim 1 having between the polyvinyl fluoride and the indicia a second thin layer of said vinyl addition polymer.

3. The article as set forth in claim 1 wherein said polymer is composed of about 3% by weight 2-hydroxy- 3-aminopropyl methacrylate, 62–97% by weight ethyl methacrylate and 35–0% by weight methyl methacrylate.

4. The article as set forth in claim 1 wherein said polymer is composed of about 3% by weight 2-hydroxy-3-aminopropyl acrylate, 62–97% by weight ethyl methacrylate and 35–0% by weight methyl methacrylate.

5. The article as set forth in claim 1 wherein said base sheet has a tenacity in the range of 2,000–2,500 p.s.i.

6. A composite film structure comprising a film of polyvinyl fluoride having a tenacity in the range of 1,800 to 3,500 lbs./sq. in., said film having on one surface indicia overcoated with a thin layer consisting essentially of a vinyl addition polymer of esters of methacrylic acid with a monohydric alkanol of 1–8 carbons, said polymer having substituents each of which bears on adjacent carbon atoms a hydroxyl radical and an amino radical bearing at least one active hydrogen atom, said amino radicals in said substituents containing from about 0.01 to 1.0% of amino nitrogen based on the weight of said polymer, said polymer having a glass transition temperature of 35–100° C. and a degree of polymerization of at least about 1,200, said structure having an initial elongation greater than 15% and a shrinkage of less than 2%.

References Cited
UNITED STATES PATENTS

| | | | |
|---|---|---|---|
| 2,955,055 | 10/1960 | Souder et al. | 117—75 |
| 3,069,291 | 12/1962 | Levine et al. | 117—75 |
| 3,111,450 | 11/1963 | Stevens | 117—138.8 |
| 3,133,854 | 5/1964 | Simms | 161—189 |
| 3,158,494 | 11/1964 | Eikvar et al. | 117—45 |
| 3,194,777 | 7/1965 | Christensen et al. | 117—161 |
| 3,200,099 | 8/1965 | Lewis et al. | 117—161 |
| 3,228,823 | 1/1966 | Usala et al. | 161—186 |

MURRAY KATZ, *Primary Examiner.*

WILLIAM D. MARTIN, *Examiner.*

W. D. HERRICK, *Assistant Examiner.*